United States Patent [19]

Gilmour

[11] Patent Number: 5,287,330
[45] Date of Patent: Feb. 15, 1994

[54] SONAR APPARATUS

[75] Inventor: George A. Gilmour, Severna Park, Md.

[73] Assignee: Westinghouse Electric Corp., Pittsburgh, Pa.

[21] Appl. No.: 89

[22] Filed: Jan. 4, 1993

[51] Int. Cl.⁵ .............................................. G01S 15/00
[52] U.S. Cl. .................................... 367/103; 367/138
[58] Field of Search ................. 367/103, 105, 138, 99, 367/88, 7; 73/626

[56] References Cited

U.S. PATENT DOCUMENTS 4,694,434  9/1987  von Ramm et al. ...................... 367/7

Primary Examiner—Daniel T. Pihulic
Attorney, Agent, or Firm—D. Schron

[57] ABSTRACT

A sonar system wherein sum and difference beam patterns are generated utilizing a plurality of transducer elements arranged in a line array. Receiver apparatus including a receiver transducer also constituted as a line array perpendicular to the transmitter transducer is used to form sum and difference receiver beams and return signals are processed so as to accurately define the azimuth as well as elevational position of a target within a target area.

10 Claims, 12 Drawing Sheets

SONAR APPARATUS

BACKGROUND OF THE INVENTION

1. Field of the Invention

The invention in general relates to sonar systems, and in particular, to sonar systems utilizing a Mills Cross transducer arrangement.

2. Background Information

In a Mills Cross arrangement, two line transducers are oriented generally perpendicular to one another with one of the transducers constituting a transmitter transducer and the other a receiver transducer. The receiver apparatus is operated in a manner to form a plurality of adjacent receiver beams while the transmitter apparatus is operated such that a transmitter beam is formed which is relatively narrow in one direction and relatively wide in a transverse direction such that the transmitter beam orthogonally intersects all of the receiver beams, the intersection defining multiple adjacent target areas from which target information may be obtained.

In order to better determine the location of a target within a target area, the apparatus may be operated so as to form, for each receiver beam, a sum and difference beam pattern characterized by a single lobe sum beam in conjunction with a dual lobe difference beam with one of the lobes having a positive phase relationship and the other a negative phase relationship relative to the sum beam.

Although the sum and difference receiver beam will more narrowly define the position of a target in the target area, such target can be anywhere within a narrow strip of the target area. The present invention will eliminate any uncertainty as to the target position by precisely pinpointing the target within the target area.

SUMMARY OF THE INVENTION

Sonar apparatus in accordance with the present invention includes a linear transmitting transducer and a linear receiver transducer arranged in a Mills Cross array. Transmitting means, including the transmitting transducer is operable to project pulses of acoustic energy having a transmitting sum and difference beam pattern. This is accomplished by projecting a first pulse having a predetermined beam pattern followed thereafter, by a time delay $\delta$, a second pulse having a different beam pattern, with one of the beam patterns being a sum and the other being a difference beam pattern. Receiver means, including the receiver transducer is operable to receive reflections of projected acoustic energy in multiple sum and difference receiving beam patterns. Multiple sum and difference signals are generated and detected, with the process including an appropriate delay of one of the signals. The modulated signals are further processed to determine azimuth and elevation of any target return from a target area.

DESCRIPTION OF THE PREFERRED EMBODIMENT

Figure 1:
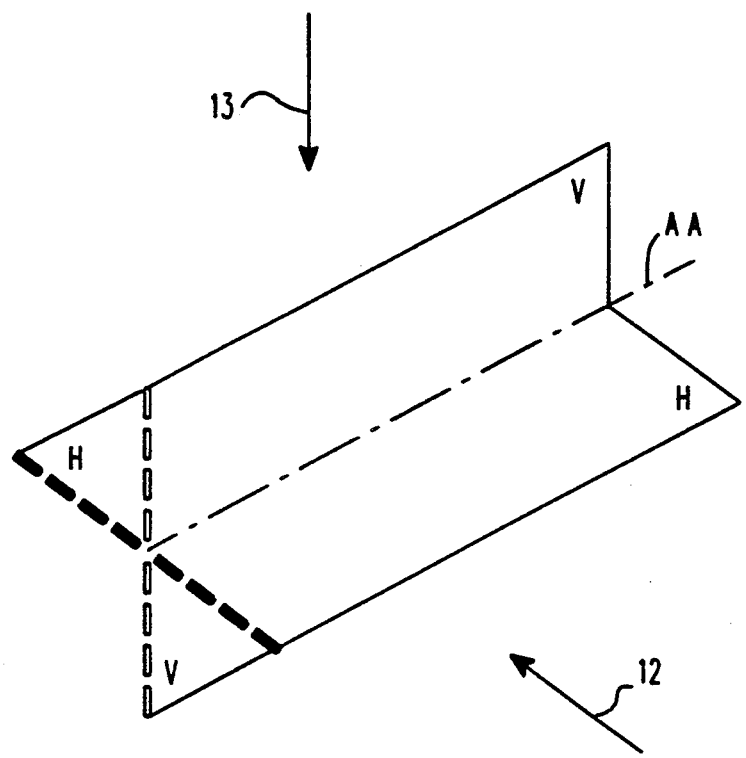
FIG. 1 is a representation of a Mills Cross transducer array.

FIG. 1 illustrates a Mills Cross arrangement which includes an elongated linear transmitting transducer T and an elongated linear receiving transducer R transversely oriented with respect to the transmitting transducer, such orientation being generally at 90°. For purposes of illustration, the transmitting transducer T lies in a plane V while the receiving transducer R lies in the plane H. The intersection of these planes is coincident with the transducer array axis AA. For convenience of explanation, plane V will be considered as being a vertical plane and plane H, a horizontal plane, although it is to be understood that other orientations are possible.

Figure 2:
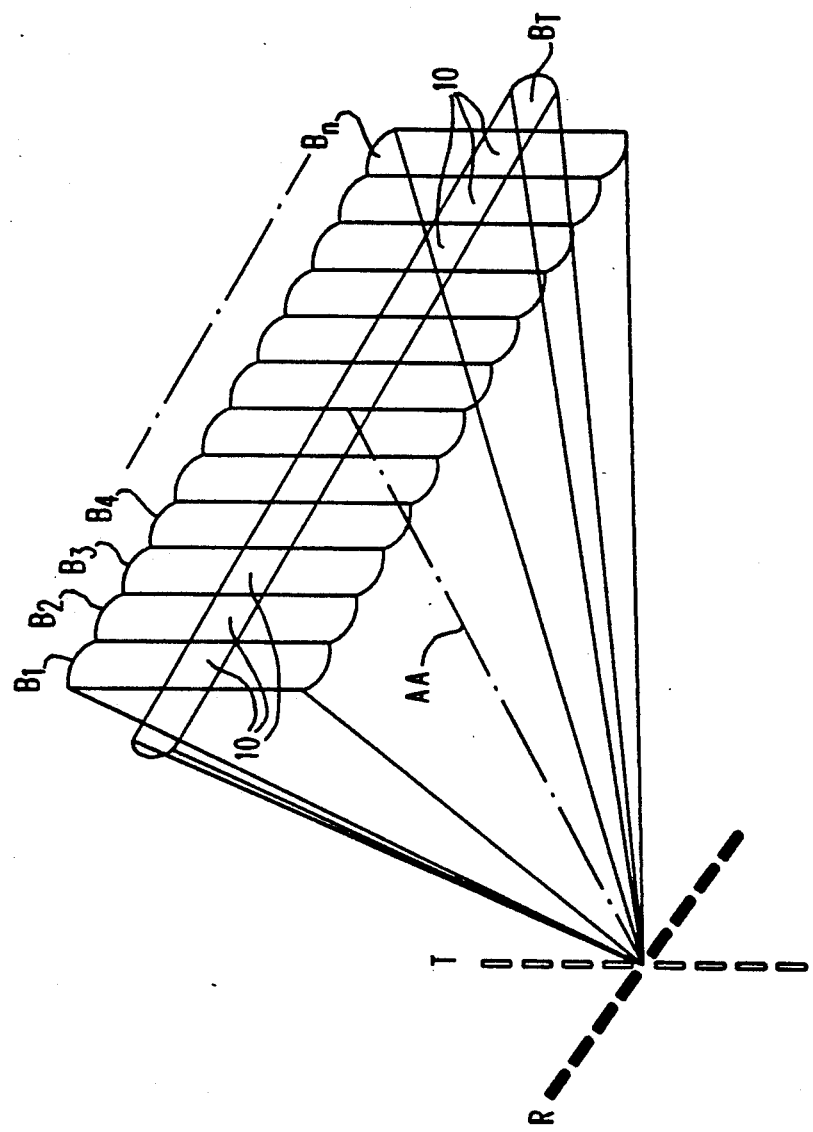
FIG. 2 illustrates the beams formed with a Mills Cross array.

With additional reference to FIG. 2, transmitter apparatus in conjunction with transducer T is operable to produce an elongated, horizontally oriented transmitter beam $B_T$. Receiver apparatus in conjunction with transducer R is operable to produce adjacent multiple vertically oriented receiver beams $B_1$ to $B_N$ with the intersection of the receiver beams with the transmitter beam defining individual target areas 10 which are examined for the presence of targets.

The location of a target within a particular target area 10 may be further defined by a well known beam splitting technique whereby each receiver beam is formed as a sum and difference beam. More specifically, and with additional reference to FIG. 3, FIG. 3A is a view of the vertical plane looking in along arrow 12 of FIG. 1, and FIG. 3B is a view of the horizontal plane looking down along the arrow 13 of FIG. 1.

Figure 3A:
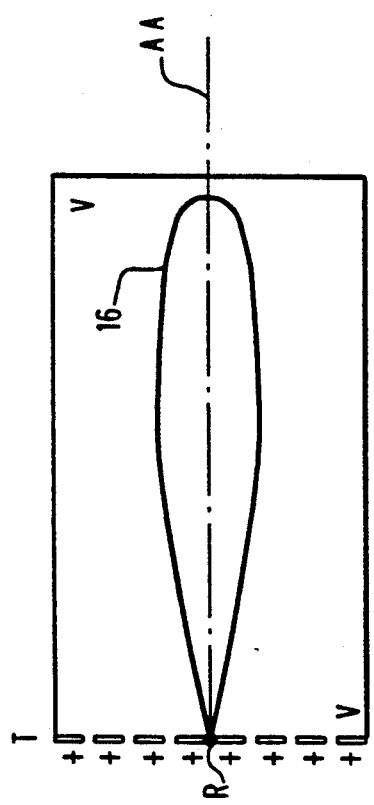
FIGS. 3A and 3B illustrate respective transmitter and receiver beam patterns of the prior art.

In FIG. 3A, illustrating the transmitter transducer T, the individual elements are phased (as indicated by the + sign) resulting in a transmitter beam pattern 16. With the elements of the receiver transducer R relatively phased as indicated in FIG. 3B, the receiver beam pattern 18 results and is comprised of a sum beam 19 and a difference beam 20 constituted by two lobes 20a, having a positive phase relationship with respect to sum beam 19, and 20b having a negative phase relationship therewith.

Figure 3B:
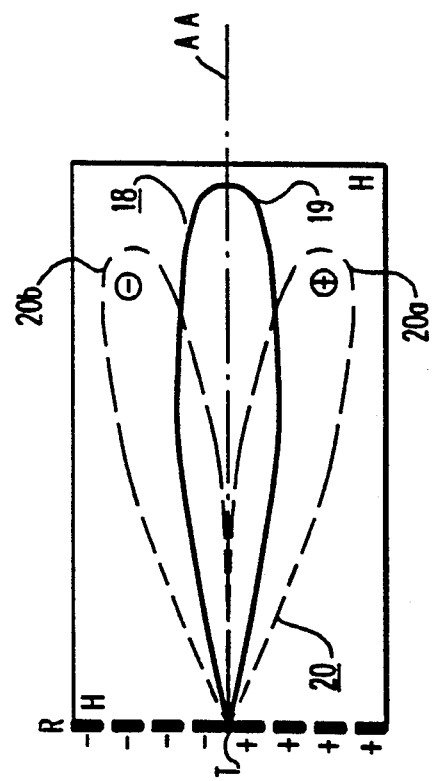
Figure 4:
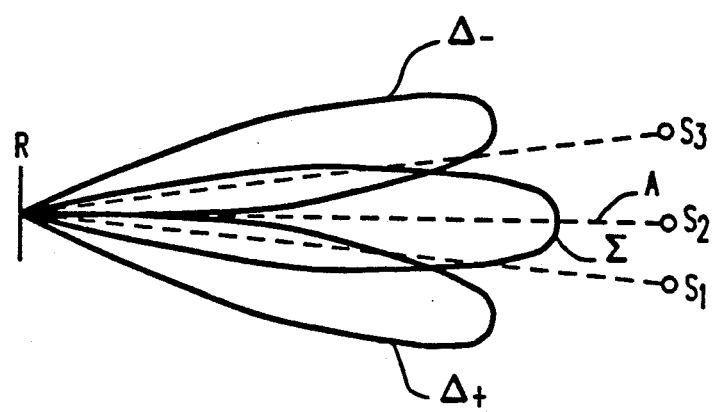
FIG. 4 illustrates a sum and difference beam pattern.

FIG. 4 duplicates a sum and difference beam pattern, as in FIG. 3B, in relation to three different targets designated $S_1$, $S_2$ and $S_3$. The sum beam has been designated $\Sigma$ and the two lobes of the difference beam are designated $\Delta_+$ and $\Delta_-$ respectively. Let it be assumed that an acoustic pulse previously transmitted is reflected from a target at $S_1$ positioned to the right (as viewed from above) of the acoustic axis A. The return signal will have a sum and difference component each having a certain magnitude, with the difference component being in phase with the sum component.

If the target is at $S_2$ the return signal will have a sum component having a certain magnitude and a difference component equal to 0. At $S_3$, reflections from the target produce a signal having sum and difference magnitudes with the difference component having a negative phase relative to the sum component.

Figure 5:
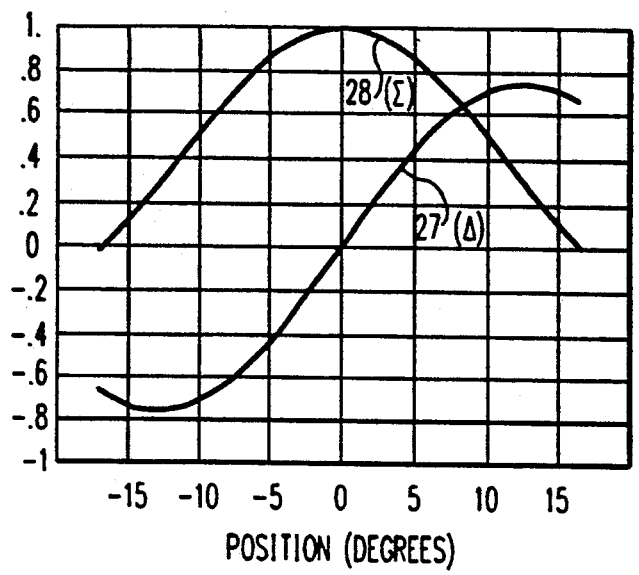
FIG. 5 is a curve illustrating the amplitude versus position of a sum and difference signal.

If the amplitude of the components of the return signal are plotted as a function of angular position relative to the acoustic axis AA, curves such as curves 27 and 28 of FIG. 5 result. Curves 27 and 28 are shown for a beam width of approximately 15°, but it is to be understood that any beam width can be used. Curve 27 is the difference curve and curve 28 is the sum curve and it is seen that at position 0° corresponding to axis AA, the sum exhibits a maximum amplitude (normalized to one) whereas the difference curve 27 passes through 0. Curve 27 to the right of the 0° position is in phase with the sum curve 28 whereas to the left of 0° the values are negative, corresponding to an out-of-phase condition with respect to sum curve 28.

Figure 6:
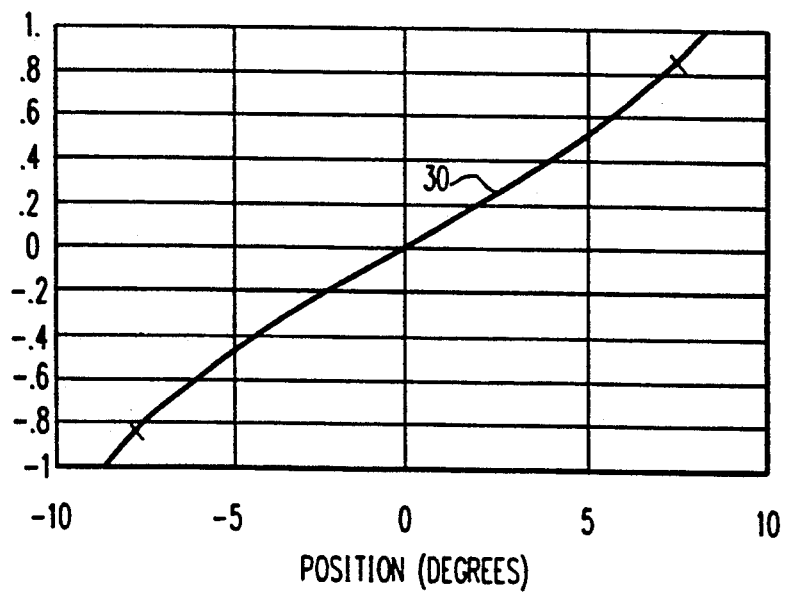
FIG. 6 is a curve of the ratio of the difference to the sum pattern of FIG. 5.

If at each position, the ratio of the magnitude of the difference value to the sum value is plotted, a curve such as illustrated in FIG. 6 results. The amplitude of curve 30 is plotted as a function of position for ratios between the 3 dB points of curve 28 of FIG. 5. Accordingly, by obtaining a value of the ratio of $\Delta$ to $\Sigma$ (corresponding to an amplitude on curve 30), the corresponding target position can be determined.

Figure 7A:
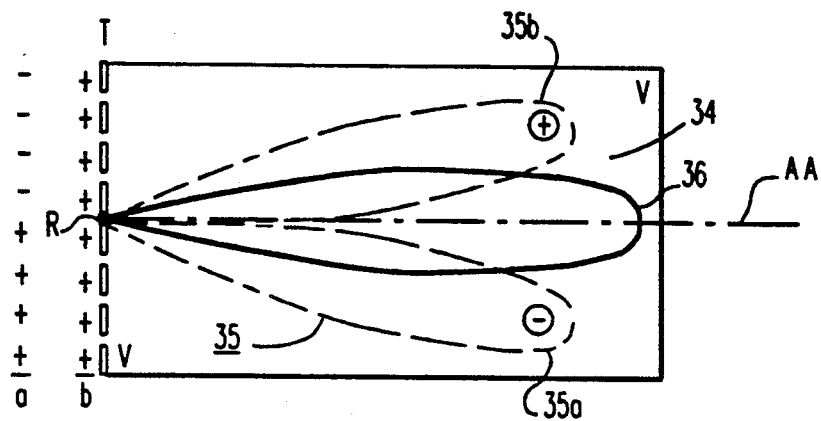
FIGS. 7A and 7B illustrate respective transmitter and receiver beam patterns utilized with the present invention.
Figure 7B:
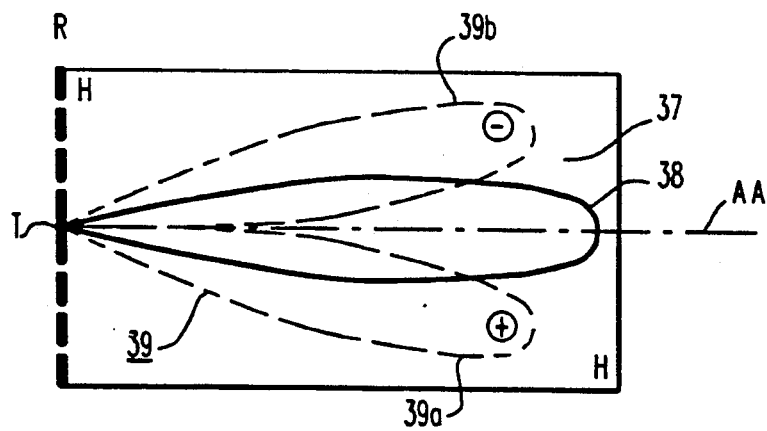

With the present invention, the location of a target within the target area may be more precisely defined. This is accomplished by beam splitting the transmitter beam pattern to form sum and difference beams, however, unlike the receiver sum and difference beams, a transmitter sum and difference beam pattern may not be formed simultaneously with the linear transmitter transducer. In the present invention, a first pulse is transmitted representing one of a sum or difference beam pattern followed thereafter, by a time delay $\delta$, by a second pulse representing the other of the sum or difference beam pattern. By way of example, and as illustrated in FIG. 7A, the elements of the transmitter transducer T may be relatively phased as indicated at a to produce the difference beam pattern 35 constituted by lobes 35a and 35b. The elements are thereafter phased as indicated at b to produce the sum beam 36. For the composite transmitted beam 34, difference lobe 35a has a negative phase relationship with respect to sum beam 36 and lobe 35b has a positive phase relationship therewith. As illustrated in FIG. 7B, the receiver beam pattern 37 is comprised of a sum beam 38 and a difference beam 39 constituted by two lobes 39a and 39b.

Figure 8A:
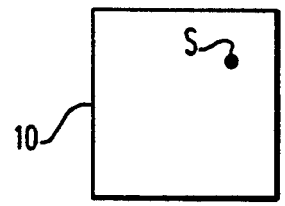
FIGS. 8A-8C show a target in a target area and detection by prior art methods as compared with the present invention.
Figure 8B:
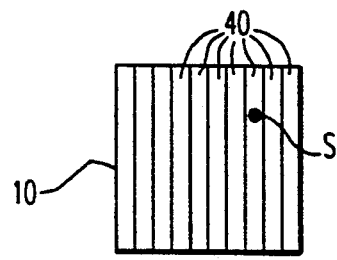
Figure 8C:
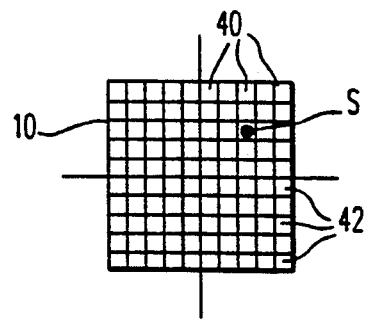

FIG. 8A illustrates a target area 10 having contained therein a detected target S. With a conventional transmitter beam such as 16 in FIG. 3A and a conventional receiver beam without beam splitting, the receiver apparatus will process the return signal indicating that there is a target somewhere in the target area 10. With receiver beam splitting, as illustrated by FIG. 3B, the target can be indicated to be somewhere in a particular one of a plurality of elongated strips 40 of the target area 10, as illustrated in FIG. 8B. Such strips are the result of the receiver beam splitting process. The target is not pin-pointed since it can be anywhere within that strip. With the present invention, however, with beam splitting on both transmission and receiving, the target can be pinpointed as being situated in a precise vertical column 40 and a precise horizontal column 42 as illustrated in FIG. 8C.

As was stated, the simultaneous formation of a sum and difference receiver pattern is conventional. Simultaneous formation of sum and difference transmitter patterns cannot be accomplished unless the transmitter array is two dimensional. Accordingly, the transmitter means of the present invention is operable to project a first pulse followed thereafter, by a time delay $\delta$, a second pulse to form the respective sum and difference portions of a composite transmitter beam. One method of accomplishing this is illustrated in FIG. 9.

The elements e in the top half of transmitter transducer T are all connected together to receive the output of driver amplifier 52. The elements e in the bottom half of the transducer are all connected together to receive the output of a second driver amplifier 54.

Figure 10:
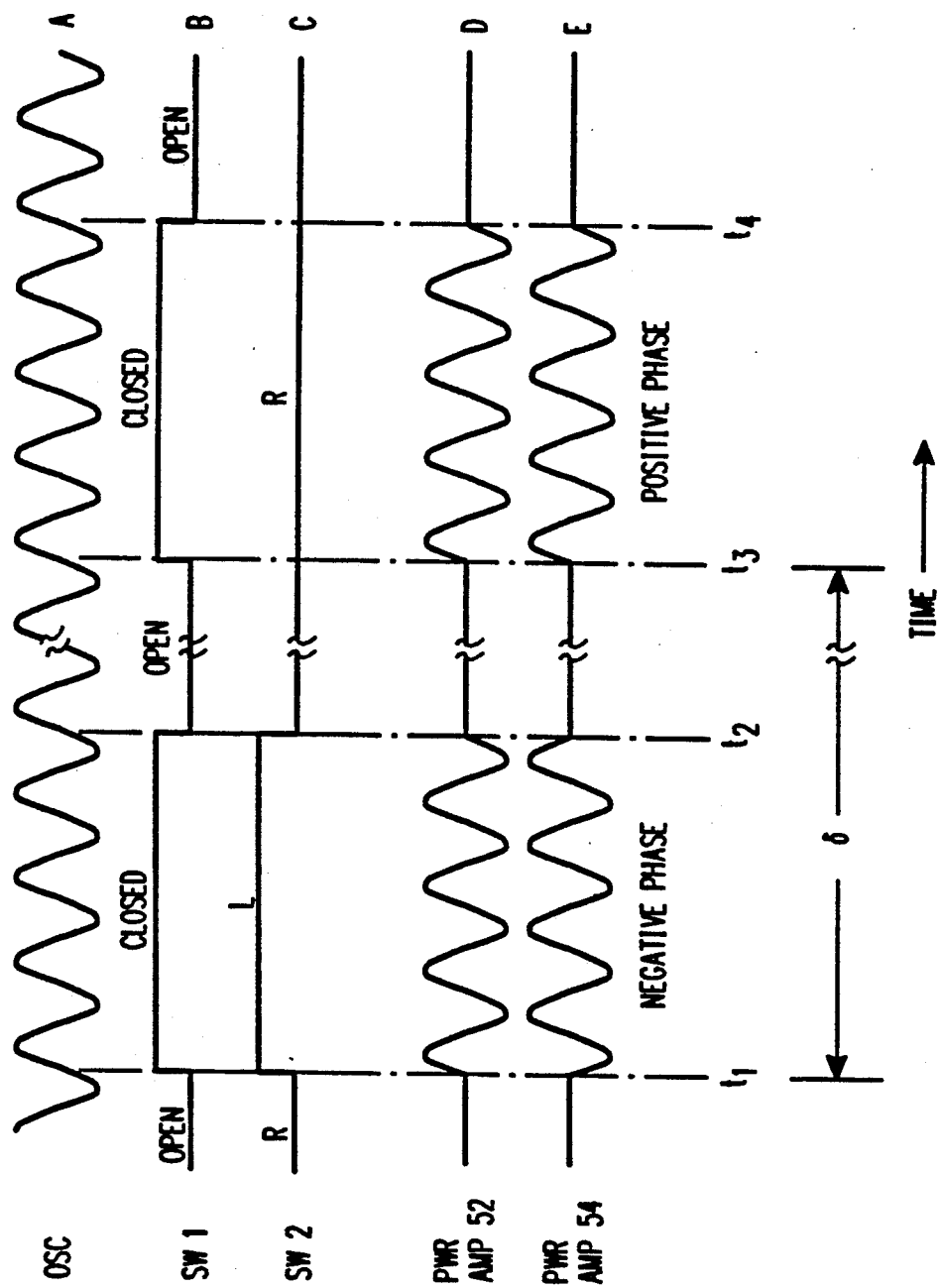
FIG. 10 illustrates waveforms to aid in the understanding of the operation of FIG. 9.

An oscillator 56 provides a sinusoidal waveform as indicated by waveform A of FIG. 10, to which additional reference is made. Waveform B of FIG. 10 shows the open and closed position of a switch S1 and waveform C shows the left and right position associated with a switch SW2, the opening and closing of such switches being under the direction of timing and control circuit 60.

Figure 9:
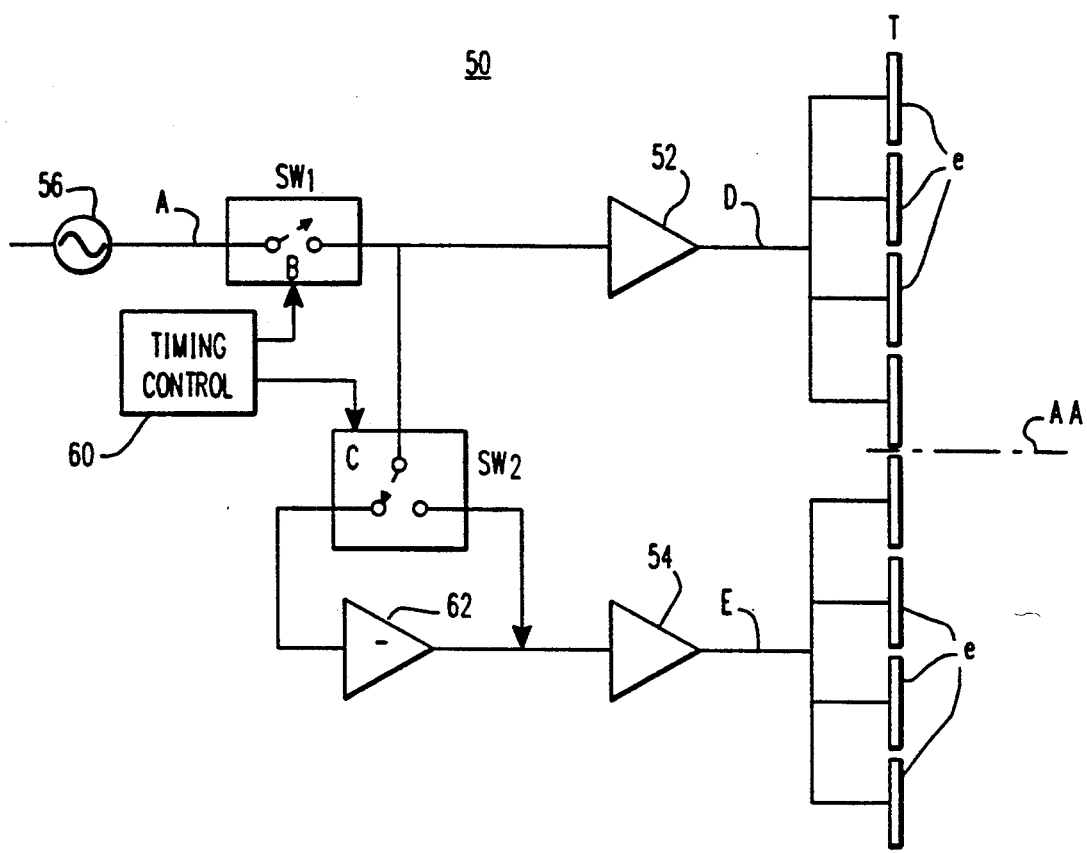
FIG. 9 is a block diagram of transmitter apparatus in accordance with the present invention.

At time $t_1$, switch SW1 is closed and switch SW2 is in the left position as illustrated in FIG. 9. Accordingly, the oscillator output is amplified by amplifier 52, as indicated by waveform D of FIG. 10, and applied to the elements in the top half of the transducer. With switch SW2 in the position indicated, the waveform is reversed in phase by inverting amplifier 62 and applied to the elements in the bottom half of the transducer by amplifier 54, the output waveform of which is indicated by curve E of FIG. 10.

At time $t_2$ switch SW1 is opened and no signal is applied to the transducer elements. Accordingly, from time $t_1$ to time $t_2$ transducer T will transmit a pulse of acoustic energy generated by applying an oscillator signal for the elements of the top half of the transducer which is 180° out-of-phase with the signal applied to the elements of the bottom half of the transducer, such operation resulting in the generation of a difference beam pattern. After a predetermined time delay $\delta$, a second pulse is generated from time $t_3$ to $t_4$. At time $t_3$ switch SW1 is closed, however, switch SW2 is placed into the right hand position such that all of the elements are identically phased, resulting in the projection of a sum beam pattern.

Figure 11:
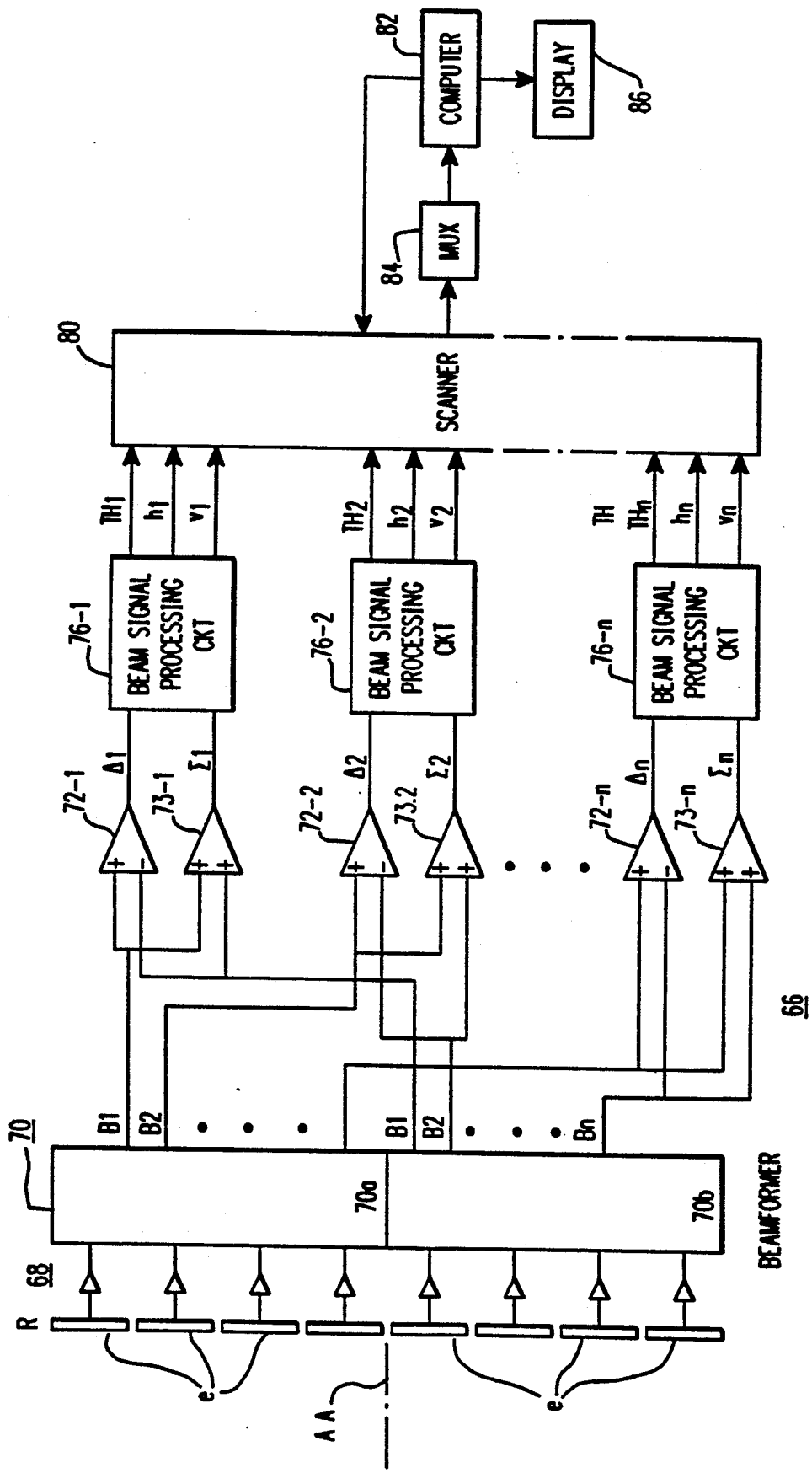
FIG. 11 is a block diagram of receiver apparatus in accordance with the present invention.

FIG. 11 illustrates a receiver means 66 for receiving and processing reflections of projected acoustic energy from any targets within the target areas. Impingement of acoustic energy will cause the elements e of receiver transducer R to provide respective output signals which are amplified by a series of preamplifiers 68 and provided to a beam former 70 comprised of two halves, 70a and 70b. Output signals from the transducer elements to the right of the acoustic axis are supplied to the half 70a, while output signals from transducer elements to the left of the acoustic axis are provided to half 70b of the beam former. The beam former is conventional in nature and may include a plurality of phase shifters and summing amplifiers such that half 70a provides N beam former signals $B_1$ to $B_N$, as does the other half 70b.

Summing amplifiers are provided for receiving the outputs from the beam former halves to generate difference and sum beam signals, $\Delta$ and $\Sigma$, for each of the N receiver beams formed. Accordingly, summing amplifier 72-1 and 73-1 are provided for beam 1 and signal $B_1$ from beam former half 70a is provided to the positive inputs of summing amplifier 72-1 and 73-1 whereas signal B from half 70b is provided to the negative input of summing amplifier 72-1 to generate the $\Delta$ beam signal and signal $B_1$ from half 70b is provided to the positive input of summing amplifier 73-1 to provide the $\Sigma$ beam signal. In a similar fashion, $\Delta$ and $\Sigma$ beam signals are generated for the remaining N beams.

Target information from the $\Delta$ and $\Sigma$ beam signals is obtained by respective beam signal processing circuits 76-1 to 76-N each of which is operable to provide a threshold signal T indicative of whether a target signal is above a predetermined threshold, a signal h indicative of the azimuth or horizontal position of the target and a signal v indicative of the elevation or vertical position of the target, thereby pin-pointing the location of a target within a target area for each receiver beam.

The output signals from the respective beam signal processing circuits are examined by way of example, by means of a scanner 80, under control of a microcomputer 82. Each of the sampled group of signals is provided to microcomputer 82 through multiplexer 84 whereby the computer combines the signals for generation of one or more target signals which may be presented to a viewer on a display 86.

Figure 12:
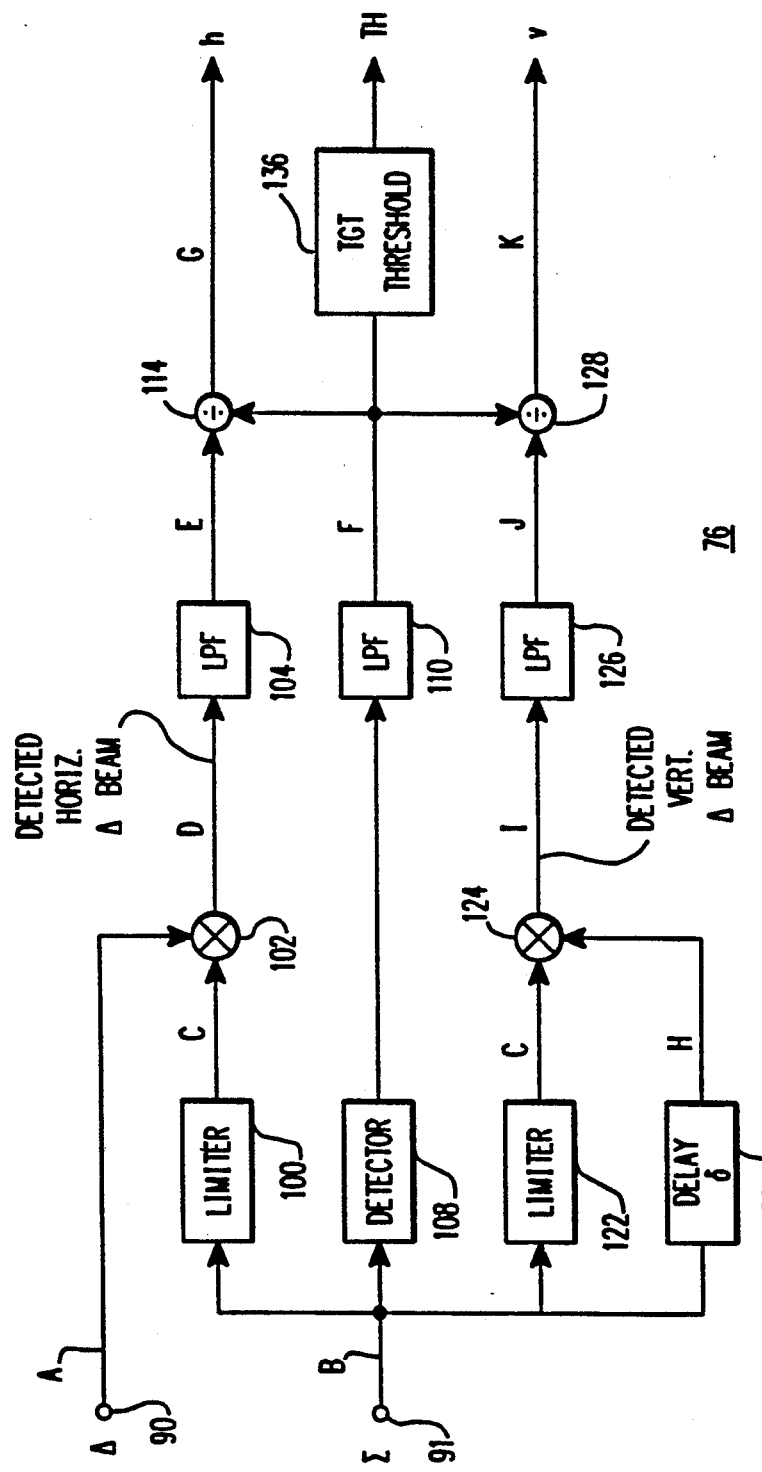
FIG. 12 is a block diagram of beam signal processing circuitry of FIG. 11.

One form of beam signal processing circuit which may be utilized herein is illustrated by way of example in FIG. 12. The $\Delta$ or difference beam signal is applied to the circuit at terminal 90, while the $\Sigma$ or sum beam signal is applied at terminal 91. In conventional circuitry, these signals would be generated as the result of the return signal from a single transmitted pulse. In the present arrangement, however, two pulses are transmitted forming a difference and sum beam and accordingly, the $\Delta$ signal applied to terminal 90 as well as the $\Sigma$ signal applied to terminal 91 each include a difference portion as well as a sum portion. That is, the difference receiver beam pattern receives the difference and sum return signals and the sum receiver beam pattern receives the difference and sum signals with the relative phasing of these signals being a function of the target and its location relative to the beams.

Figure 13:
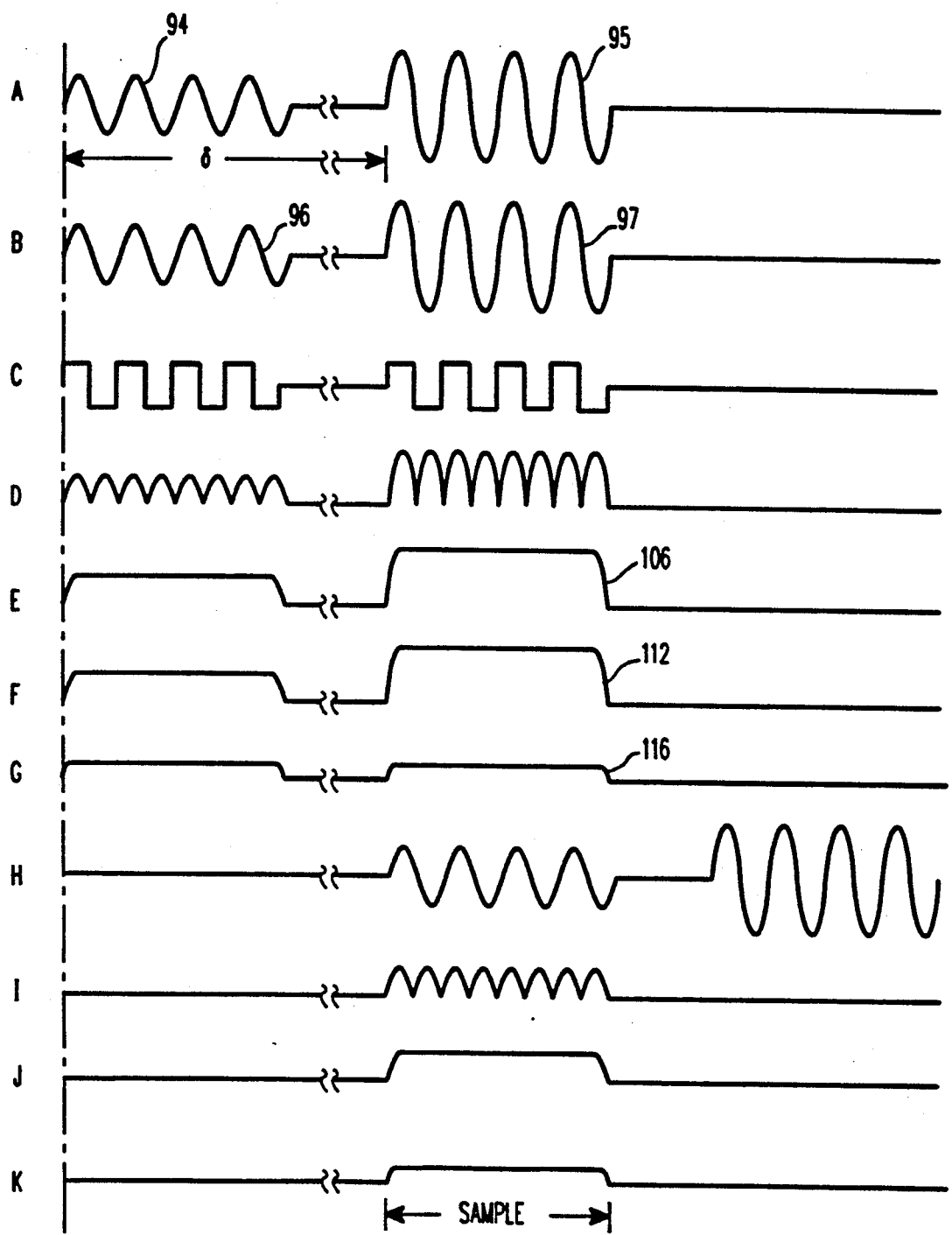
FIG. 13 illustrates waveforms of signals appearing at various locations in FIG. 12.

By way of example, and with additional reference to FIG. 13, curves A and B illustrate the respective $\Delta$ and $\Sigma$ beam signals having phases indicative of a target above the plane H and to the right of the plane V (see FIG. 1). Curve A represents the receipt of acoustic energy by the receiver difference beam and portion 94 represents the received difference signal. After a time delay $\delta$ the reflected sum signal is received by the receiver difference beam pattern with this latter reception resulting in a second portion, 95, of the difference receiver beam. In a similar fashion and with reference to curve B, the two reflected transmissions picked up by the receiver sum beam results in first and second portions 96 and 97 of the beam signal.

The sum beam signal at terminal 91 is provided to limiter 100, the output of which is the squared off wave of curve C and which is used to synchronously demodulate the difference signal applied at terminal 90. This is accomplished by providing both signals to multiplier 102 resulting in waveform D with the synchronous demodulation process obtaining the polarity of the waveform A, in this case a positive polarity. A demodulated signal value is obtained by applying waveform D to low pass filter 104 resulting in waveform E which is the detected $\Delta$ beam signal. The second portion, 106, of this waveform has a magnitude corresponding to some point on curve 27 of FIG. 5, and more particularly on the positive portion of such curve.

Curve 28 of FIG. 5 is derived by detecting the sum signal at terminal 91 by applying it to detector 108 resulting in waveform F after filtering in low pass filter 110. The amplitude of portion 112 of curve F represents some point on the right-hand side of curve 28 of FIG. 5. The ratio, $\Delta/\Sigma$, is provided by divider 114 with the output, waveform G, more particularly portion 116 thereof, representing a point on curve 30 of FIG. 6 corresponding to an exact horizontal position for the target in the beam number being processed.

The obtaining of this horizontal location is conventional, however, the obtaining of a corresponding vertical position requires modification to account for the dual pulse transmission. As previously discussed, curves such as those in FIG. 5 also apply to obtaining the vertical position and the difference value, corresponding to a point on curve 27, is obtained with the provision of delay circuit 120 having a delay corresponding to $\delta$. The delayed waveform B appears as curve H which is synchronously demodulated by the output of limiter 122 identical to the output of limiter 100 and characterized by curve C. The synchronous demodulation is accomplished by providing the two signals to multiplier 124 the output of which, curve I, is provided to low pass filter 126, having an output represented by curve J with an amplitude corresponding to some point on curve 27. The corresponding value for curve 28 of FIG. 5 has already been obtained (portion 112 of curve F) and their ratio, the output of divider circuit 128 is waveform K having an amplitude corresponding to a point on curve 30 of FIG. 6 as it would apply to the vertical situation.

In order to avoid the processing and display of noise for relatively small targets of no interest, the apparatus may include a target threshold circuit 130 which will provide an output TH if the sum signal is above a predetermined threshold value. The scanner apparatus of FIG. 12 is operable to first examine if signal T is present, indicating a target of interest, and if so, the values of h and v are provided to the microcomputer for target location computation based upon the value of h and v. All of the beams are sampled within a sample time as indicated in FIG. 13.

Accordingly, there has been provided a sonar apparatus wherein transmitter apparatus is operable to generate a sum and difference beam pattern from a line array of transducers, as opposed to a two dimensional array of transducers and wherein the receiver apparatus forms sum and difference receiver beams, with the beam signals being processed to accurately pin point a target within a particular target area. Although a single dual pulse transmission is illustrated, several such transmissions may take place while the receiver beams are being formed with each such transmission being offset from a previous one. With this type of operation, information relative to each transmission would be provided to the microcomputer 82 of FIG. 11 so that computated target positions may be properly displayed.

I claim:

1. Sonar apparatus having a linear transmitting transducer and a linear receiver transducer transverse thereto arranged in a Mills Cross array comprising:
   a) transmitting means, including said transmitting transducer, for projecting pulses of acoustic energy and operable to project a first pulse having a predetermined beam pattern followed thereafter, by a time delay $\delta$, a second pulse having a different beam pattern;
   b) one of said beam patterns being a sum and the other being a difference beam pattern; and
   c) receiver means, including said receiver transducer, for receiving and processing reflections of projected acoustic energy according to a sum and difference receiving beam pattern.

2. Apparatus according to claim 1 wherein:
   a) said difference beam pattern is transmitted first followed by said sum beam pattern.

3. Apparatus according to claim 1 wherein:
   a) said transmitter transducer is comprised of a plurality of transducer elements arranged in a linear array;
   b) said transmitter means includes
      i) an oscillator providing an oscillator signal,
      ii) means for reversing the phase of said oscillator signal,
      iii) switch means operable to provide said oscillator signal simultaneously to all of said transducer elements to produce said sum beam, and to provide said oscillator signal to a predetermined number of said transducer elements and to provide said reverse phased oscillator signal to the remainder of said transducer elements, to produce said difference beam.

4. Apparatus according to claim 3 wherein:
   a) said difference beam is transmitted first; and which includes
   b) timing and control means operable to control said switch means such that a first pulse representative of said difference beam is transmitted followed by a second pulse representative of said sum beam;
   c) the time difference between the transmission of said first and the transmission of said second pulse being $\delta$.

5. Apparatus according to claim 2 wherein:
   a) said receiver transducer is comprised of a plurality of transducer elements;
   b) said receiver means includes
      i) circuit means, including beamformer means connected to said receiver transducer elements for generating, in response to said reflections of projected acoustic energy, a plurality of receiver beams each constituted by a difference beam signal and a sum beam signal,
      ii) plurality of beam signal processing circuits each responsive to a respective difference and sum receiver beam signal and operable to derive first and second positional signals indicative of the position of a target within a target area.

6. Apparatus according to claim 5 which includes:
   a) display means;
   b) means responsive to said positional signals provided by said plurality of beam signal processing circuits for displaying said targets on said display means.

7. Apparatus according to claim 6 wherein:
   a) said means for displaying is operable to display target indications only if a predetermined one of said beam signals is above a selected threshold level.

8. Apparatus according to claim 5 wherein:
   a) said beam signal processing circuit includes
      i) first demodulator means for demodulating said sum beam signal to derive a sum signal,
      ii) second demodulator means for demodulating said difference beam signal to derive a first difference signal,
      iii) means for obtaining the ratio of said first difference signal to said sum signal, the result constituting said first positional signal,
      iv) delay means for delaying said sum beam signal by an amount $\delta$,
      v) third demodulator means for demodulating said delayed beam signal to derive a second difference signal, and
      vi) means for obtaining the ratio of said second difference signal to said sum signal, the result constituting said second positional signal.

9. Apparatus according to claim 8 which includes:
   a) a threshold circuit for receiving said sum signal and providing an output signal only if said threshold is exceeded.

10. Apparatus according to claim 9 wherein:
    a) said first and third demodulator means includes means for maintaining the polarity of said beam signals.

* * * * *